(12) United States Patent
Clark

(10) Patent No.: US 7,448,578 B2
(45) Date of Patent: Nov. 11, 2008

(54) AIRCRAFT WITH FORWARD OPENING INLAY SPOILERS FOR YAW CONTROL

(75) Inventor: Walter Dennis Clark, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 805 days.

(21) Appl. No.: 11/023,949

(22) Filed: Dec. 28, 2004

(65) Prior Publication Data

US 2006/0102802 A1 May 18, 2006

Related U.S. Application Data

(62) Division of application No. 10/353,660, filed on Jan. 29, 2003, now Pat. No. 6,892,982.

(51) Int. Cl.
*B64C 3/58* (2006.01)
*B64C 9/00* (2006.01)

(52) U.S. Cl. .............. 244/213; 244/201; 244/204; 244/36; 244/214; 244/217; 244/45 R; 244/9; 244/123; 244/90 A; 244/90 B

(58) Field of Classification Search .......... 244/36, 244/213, 214, 215, 217, 45 R, 89, 90 A, 90 B, 244/123, 204, 201, 9
See application file for complete search history.

(56) References Cited

U.S. PATENT DOCUMENTS

| 1,549,122 | A | * | 8/1925 | Lanier | 244/204 |
|---|---|---|---|---|---|
| 1,845,960 | A | * | 2/1932 | Daniell | 244/113 |
| 1,991,651 | A | * | 2/1935 | Bauer | 244/45 R |
| 2,141,984 | A | * | 12/1938 | Hilmy | 244/218 |
| 2,164,531 | A | * | 7/1939 | Lee | 244/113 |
| 2,402,311 | A | * | 6/1946 | Bissett | 244/13 |
| 2,418,273 | A | * | 4/1947 | Moore | 244/213 |

(Continued)

FOREIGN PATENT DOCUMENTS

JP 09024897 A * 1/1997

OTHER PUBLICATIONS

George Lucas, "The Empire Stikes Back", Snowspeeder, pp. 1-3.*

(Continued)

*Primary Examiner*—Michael R. Mansen
*Assistant Examiner*—Valentina Xavier
(74) *Attorney, Agent, or Firm*—Robert P. Lenart, Esq.; Pietragallo Gordon Alfano Bosick & Raspanti, LLP

(57) ABSTRACT

An aircraft comprises first and second wings positioned on opposite sides of a longitudinal axis with each of the first and second wings including an upper surface and a lower surface, wherein no control surfaces are attached to the lower surface of the wings. A first forward opening control surface is attached by a first hinge to an upper surface of the first wing and a second forward opening control surface being attached by a second hinge to an upper surface of the second wing. Each of the first and second hinges is canted with respect to a direction perpendicular to the longitudinal axis. A method of yaw control performed by the aircraft is also included.

2 Claims, 2 Drawing Sheets

U.S. PATENT DOCUMENTS

| | | | | |
|---|---|---|---|---|
| 2,605,984 | A * | 8/1952 | Robinson | 244/204 |
| 2,948,492 | A * | 8/1960 | Barnes | 244/204 |
| 3,684,217 | A * | 8/1972 | Kukon et al. | 244/36 |
| 3,721,406 | A * | 3/1973 | Hurlbert | 244/216 |
| 4,007,896 | A * | 2/1977 | Reynolds, III | 244/215 |
| 4,019,699 | A * | 4/1977 | Wintersdorff et al. | 244/121 |
| 4,182,503 | A * | 1/1980 | Muscatell | 244/219 |
| 4,432,516 | A * | 2/1984 | Muscatell | 244/219 |
| 4,553,721 | A * | 11/1985 | Jorgensen | 244/213 |
| 4,624,424 | A * | 11/1986 | Pinson | 244/3.21 |
| 4,632,340 | A * | 12/1986 | Duea | 244/198 |
| 4,729,528 | A * | 3/1988 | Borzachillo | 244/90 R |
| 4,739,957 | A * | 4/1988 | Vess et al. | 244/199 |
| 5,034,751 | A * | 7/1991 | Miller, Jr. | 342/368 |
| 5,096,144 | A * | 3/1992 | Fishwick | 244/110 D |
| 5,114,097 | A * | 5/1992 | Williams | 244/119 |
| 5,158,252 | A * | 10/1992 | Sakurai | 244/214 |
| 5,531,402 | A * | 7/1996 | Dahl | 244/75 R |
| 6,050,522 | A * | 4/2000 | Brossier et al. | 244/110 B |
| 6,491,261 | B1 * | 12/2002 | Blake | 244/213 |
| 6,595,466 | B2 * | 7/2003 | Depeige et al. | 244/118.3 |
| 2003/0230677 | A1 * | 12/2003 | Milliere | 244/213 |

OTHER PUBLICATIONS dictionary.com; "integrated", pp. 1-3.*
"Wings for All Speeds", Advanced Topics in Aerodynamics, www.aerodyn.org/wings/wings.html.*
Answers.com, angle of incidence, pp. 1-4.*

* cited by examiner

AIRCRAFT WITH FORWARD OPENING INLAY SPOILERS FOR YAW CONTROL

CROSS-REFERENCE TO RELATED APPLICATION

This application is a divisional application of U.S. patent application Ser. No. 10/353,660, filed Jan. 29, 2003.

FIELD OF THE INVENTION

The invention relates generally to aircraft, and more specifically, to systems and methods for control of an aircraft.

BACKGROUND INFORMATION

Aircraft purposefully built to avoid radar detection are characterized by shapes with as few different angles as possible. This results in edges which are parallel to each other even if on opposite sides of the aircraft. It is also desirable to have a fuselage that is blended into the wing where any shapes of small radius can be placed on the upper side, unseen by ground radar. Because of this smooth integration, these aircraft are sometimes referred as "flying wings." An example of a flying wing aircraft is the B-2 bomber. An aircraft of low radar cross section is devoid of any unnecessary protuberances such as a vertical stabilizer, having its function replaced by control surfaces that increase the drag on one wing or the other only when needed and otherwise lie against the wing to become part of the wing.

The advantages of all-wing, tailless aircraft are known. For example, tailless aircraft provide enhanced stealthy operating characteristics due to their inherent low-observable configuration. Moreover, all-wing aircraft provide other benefits such as improved efficiency due to reduced weight and drag and, accordingly, are well suited for use in a wide variety of applications such as in autonomous (unmanned) aircraft where the bulge for a pilot to look out doesn't have to be accommodated.

A significant disadvantage of the tailless aircraft configuration lies in the absence of an aircraft rudder normally incorporated within the vertical tail section. The rudder is provided in conventional aircraft to provide a side to side or yaw moment to the aircraft in flight. Therefore, without a rudder, other means must be provided to impart yaw moment to the tailless aircraft. Traditionally, tailless aircraft use spoilers in the outboard part of the wing. Either the left side or the right side can be made to open to control the lateral direction of flight. These spoilers are either made a part of the existing elevons, elevators or ailerons in the form of split flaps or they are mounted ahead of these surfaces in the form of inlay spoilers. Elevons, ailerons and elevators on all-wing aircraft have a minimal contribution to radar cross section. The spoiler is the largest detractor of stealth because it forms acute angles with the surface it emerges from. Traditional inlay spoilers can be low in cross section if they are only opened on the topside. The wing itself masks the view from below. But a topside only spoiler of conventional design produces a down force and, if the spoiler is near the tip of a sweptback wing, the resulting force will pitch the airplane upward.

As such, based upon the foregoing, there exists a need in the art for an improved method and device, which improves aircraft yaw control characteristics without substantially interfering with the aircraft aerodynamic and radar detectability characteristics.

SUMMARY OF THE INVENTION

An aircraft comprises first and second wings positioned on opposite sides of a longitudinal axis with each of the first and second wings including an upper surface and a lower surface, wherein no control surfaces are attached to the lower surface of the wings. A first forward opening control surface is attached by a first hinge to an upper surface of the first wing and a second forward opening control surface being attached by a second hinge to an upper surface of the second wing. Each of the first and second hinges is canted with respect to a direction perpendicular to the longitudinal axis.

In another aspect, the invention provides a method of yaw control of an aircraft. The method comprises the steps of providing a first forward opening, canted spoiler in a top surface of a first wing of the aircraft, wherein the first wing includes a bottom surface without control surfaces; providing a second forward opening, canted spoiler in a top surface of a second wing of the aircraft, wherein the second wing includes a bottom surface without control surfaces; and operating the first and second spoilers differentially to create a yaw moment.

DETAILED DESCRIPTION OF THE INVENTION

Figure 1:
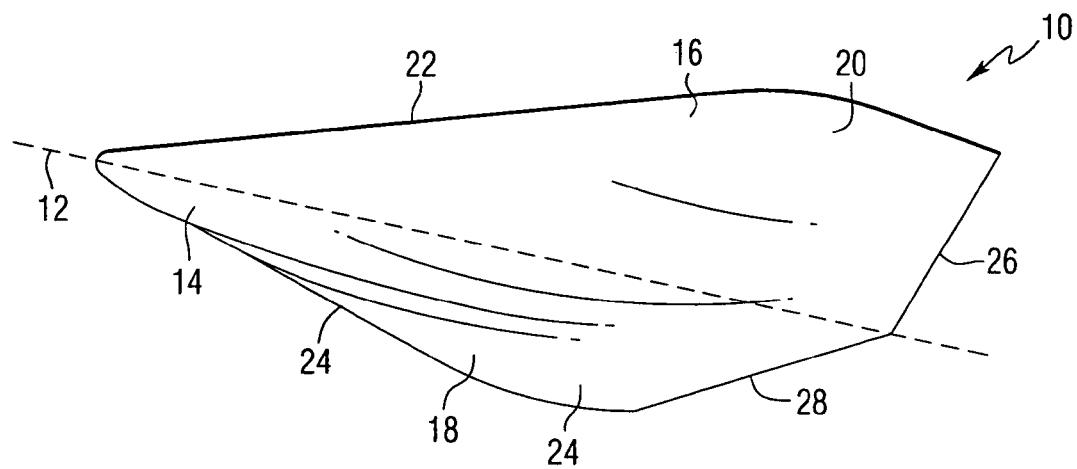
FIG. 1 is a schematic representation of a perspective view of a swept back aircraft that can be constructed in accordance with this invention.

In accordance with an aspect of the invention, a flying wing tailless aircraft comprises an integrated fuselage/wing that generally defines the aircraft and control surfaces integrally formed therewith. FIG. 1 is a schematic representation of a perspective view of a swept back aircraft 10 that can be constructed in accordance with this invention. The aircraft 10 has a longitudinal axis 12 and is provided with a central fuselage 14 positioned along the longitudinal axis. A pair of opposing swept back wings 16, 18 extend laterally and in an aftward direction from the fuselage 14. The wings 16, 18 have an outer contour which blends smoothly and continuously with that of the fuselage 14. In this respect, the fuselage 14 is completely integrated with the wings 16, 18. This smooth integration is contemplated to give the entire aircraft 10 the appearance and functionality of being a single wing. Thus, the integrated fuselage/wing configuration generally defines the aircraft 10. As such, the aircraft 10 may be characterized by having a relatively low aspect ratio and a generally triangular or delta-shaped planform.

The aircraft 10 is provided with an upper surface and a lower surface. The upper and the lower surfaces encompass both the fuselage 14 and the wings 16, 18. FIG. 1 shows the lower surface 20. In addition, the wings 16, 18 include leading edges 22, 24, respectively. The leading edges 22, 24 are configured to, for example, form a continuous straight contour. Such a straight contour is desirable in light of radar signature mitigation considerations, i.e., forming a low-observable, delta-shaped aircraft. The leading edges 22, 24 of the wings 16, 18 along with the upper surface of the aircraft 10 generally define the aerodynamic lifting surface of the aircraft 10. As such, the aerodynamic lifting surface is generally disposed about the fuselage 14 and the wings 16, 18. The wings 16, 18 also include trailing edges 26, 28, respectively.

Figure 2:
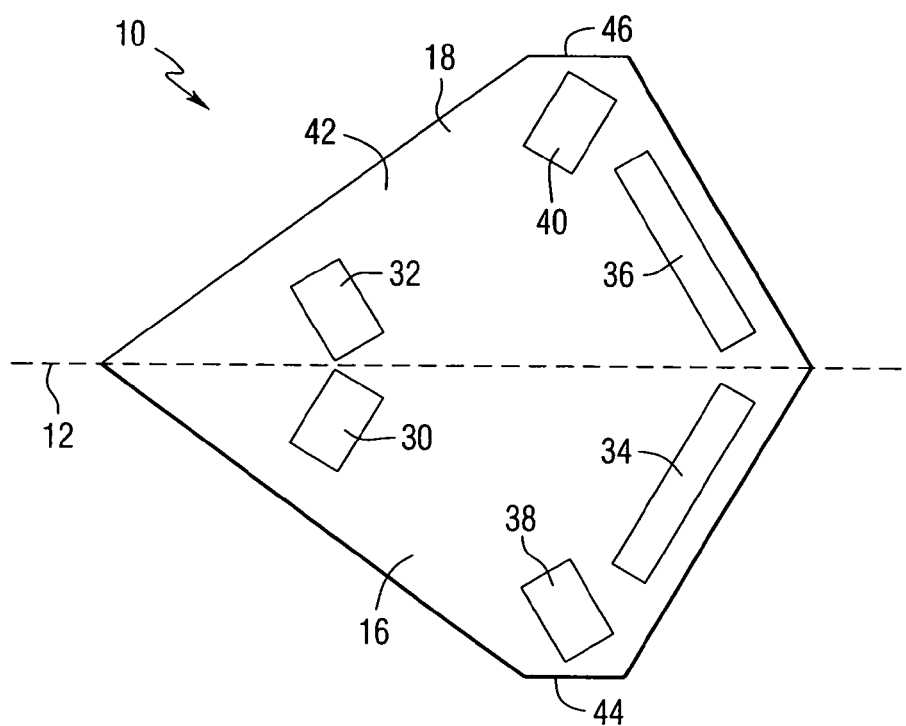
FIG. 2 is a schematic representation of a top plan view of the aircraft of FIG. 1, showing inlay spoilers.

FIG. 2 is a schematic representation of a top plan view of the aircraft of FIG. 1. As seen in FIG. 2, the aircraft 10 also includes control surfaces 30, 32, 34, 36, 38 and 40 that are integrally formed with the upper surface 42 of the fuselage/wing configuration. Specifically, the control surfaces may include, for example, elevons, ailerons, elevators, rudders, trim tabs, or similar components that are well known in the art.

In accordance with this invention, some control surfaces can be positioned in the top surface of the aircraft so as to prevent them from being seen by ground radar. The particular control surface which should be only on the top are those that open up so as to create drag. The other surfaces, the elevator and ailerons, can be hinged to move up and down with little sacrifice in radar cross section. The topside only control surfaces are called inlay spoilers and can be operated to control the yaw of the aircraft. A conventional inlay spoiler opens up like a hatch door with a hinge on the upwind side. It creates drag but also creates a force into the wing. In this invention, the yaw control inlay spoiler is hinged in the back. In one embodiment, at least some of the control surfaces can be this hinged-in-the-back inlay spoiler type that can be operated between open and retracted positions. When in the retracted position, the surfaces of the spoilers conform to the surface of the wings.

By operating a pair of conventional inlays 30, 32 (hinged in the front) in the front of the aircraft, a down-moment can be produced. A pair of conventional inlays 34, 36 in the back can provide an up-moment. Thus inlays 30, 32, 34 and 36 can be operated in pairs to provide pitch control. Since inlay spoilers are very high drag devices, trimming in pitch can be done with fuel shifting. Roll control can be achieved by operating the same four inlays in pairs laterally. That is, pairs 30 and 34, or 32 and 36 can be operated to provide roll control. The inlays 38 and 40 near the wing tips 44, 46 provide yaw control.

Inlays 38 and 40 are forward opening inlay spoilers. Forward opening inlay spoilers for yaw control can provide pure yaw and are free of any pitch or roll moment if their hinges are canted with respect to air flow. If the air were allowed to build up in front, the surface would produce a down force just like the conventional hinge-in-front spoilers.

This invention permits a reduction in the aircraft radar cross section by eliminating the need for bottom side spoilers so that surface discontinuities in the bottom of the aircraft can be minimized. The particular problem with spoilers with regard to radar signature is that in opening they form an acute angle with the surface they rise out of. This creates a retro-reflecting structure for radar to bounce off of.

Figure 3:
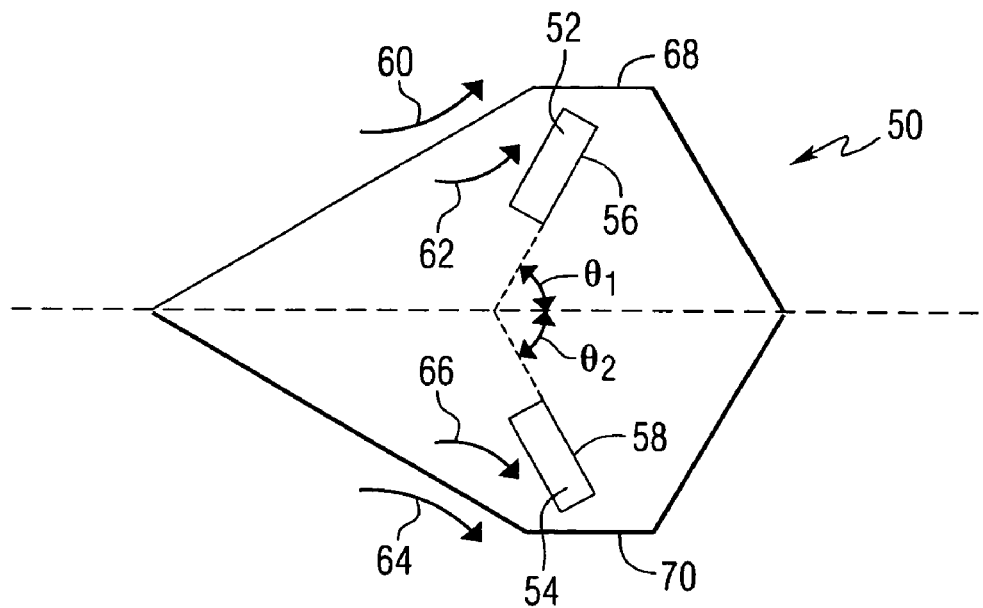
FIG. 3 is a schematic representation of a top plan view of an aircraft showing yaw control spoilers.

FIG. 3 is a schematic representation of a top plan view of an aircraft 50 showing yaw control spoilers 52 and 54. The spoilers are hinged along edges 56 and 58 so that they open in a forward direction. The spoilers are canted with respect to the longitudinal axis of the aircraft at angles $\theta_1$ and $\theta_2$. Angles $\theta_1$ and $\theta_2$ can be the same angle. Arrows 60, 62, 64 and 66 show the direction of air flow in the vicinity of the spoilers. Since the spoilers are canted outward, air is directed toward the wing tips 68 and 70.

Figure 4:
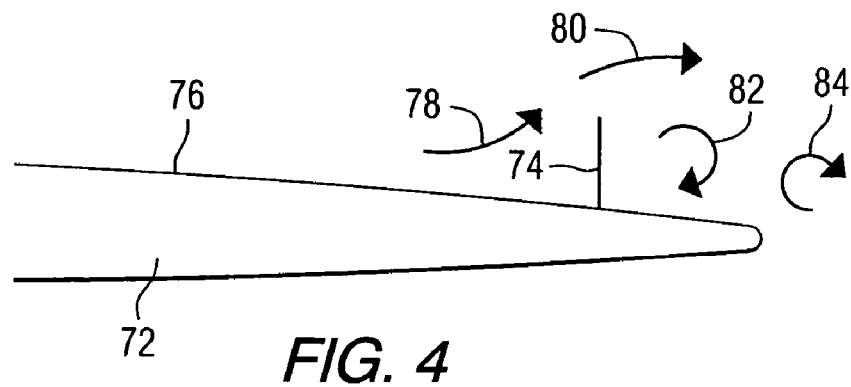
FIG. 4 is a schematic representation of a side view of a portion of a wing and a vertical spoiler.

By adjusting the cant angle (the azimuth position of the inlay) the up or down force can be brought to zero for pure yaw control. This is important in swept wings because the tips are so far aft. Even vertical spoilers with all their mechanical complexity produce a down force. FIG. 4 is a schematic representation of a side view of a portion of a wing 72 and a vertical spoiler 74 positioned in a top surface 76 of the wing. Arrows 78, 80, 82 and 84 illustrate air flow in the vicinity of the spoiler 74 showing how air is deflected upward with a consequent down force.

Figure 5:
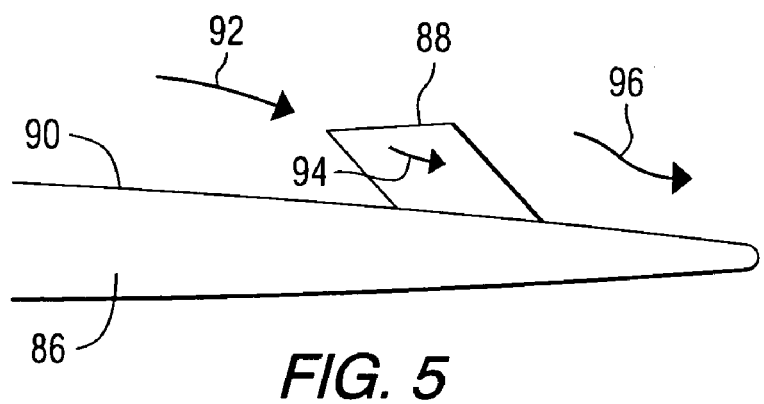
FIG. 5 is a schematic representation of a side view of a portion of a wing and a forward opening spoiler.

FIG. 5 is a schematic representation of a side view of a portion of a wing 86 and a forward opening spoiler 88 positioned in a top surface 90 of the wing. Arrows 92, 94 and 96 illustrate air flow in the vicinity of the spoiler 88.

FIG. 4 shows that a vertical spoiler 74 causes a net change in momentum upward, whereas with a canted and tilted surface as shown in FIG. 5, much of the air is withdrawn without going up. This is shown in FIG. 5 where the arrow 94 shows the air escaping horizontally. Drag is still created but by canting the surface the airflow is kept from damming up in front of the spoiler, which would force the air up and over like a vertical spoiler. The side deflection can be outward or inward. By choosing outward deflection, the air thrown to the side imparts an inward force that produces a moment, which is in the same direction as the moment due to drag. By adjusting the cant angle, the down force produced by the forward opening spoiler can be balanced against the up force of the air piling up in front of the spoiler.

This invention is particularly applicable to swept back flying wing aircraft because there is no force down into the wing. Ordinary inlay spoilers (hinged in the front) will impart a down force which will pitch the aircraft up. Since this invention provides a yaw moment without an up or down force it can be used for wings where the tips are behind the center of gravity.

To demonstrate, in a model, the pure yaw behavior of the forward opening spoiler, the variable dihedral effect of the sweepback must be overcome. Otherwise, the yaw will produce a roll which would mask the unwanted roll produced by any down force. The effect of the sweepback can be overcome by flying the model with the weight off the wings. A model was built and then test flown at zero lift, that is, in a ballistic trajectory. That allowed the yaw to occur without affecting roll. If the model rolled in zero lift, it must be due to the unwanted up or down force.

To perform that test, a remote control catapult model was made with a single topside-only forward opening spoiler. This was added to an existing model that was equipped with normal control surfaces. The normal controls were used to recover the airplane after the ballistic flight to land it safely. The trajectory of the airplane upon launch can be judged by the eye to be ballistic. The transmitter's pitch trim was adjusted until the familiar arc was achieved. Just before hitting the ground, the control stick was pulled back for a gentle landing.

A shroud was provided in front of the inlay to keep the leading edge of the new spoiler flush with the skin. The shroud and the spoiler could be rotated in azimuth or even repositioned on the wing for different test flights. In practice, the surfaces would not necessarily share the same place on the wing.

After several ballistic launches and subsequent recovery maneuvers, a flight was made where near the top of the trajectory, the forward opening spoiler was popped open. Success could be measured by seeing the surface open up without the airplane rolling, or pitching. A canted angle of about 50 degrees produced pure yaw.

In this invention, the inlay spoilers on the top surface of the aircraft are not matched by anything on the bottom. Inlay spoilers and topside control surfaces have been used previously, but they have all been hinged in the front or they rose vertically. When these conventional inlays are installed on the topside of swept or delta wings, they must be balanced by inlay spoilers on the bottom. An unbalanced surface in the back will affect both pitch and roll. But with this invention, the yaw control spoilers are self-balancing. The bottom skin need not have any control surface on it and is thus more easily rendered low in radar cross section.

This invention provides a wing mounted yaw control device. The wing mounted yaw control device includes spoilers hingedly mounted on a top surface and canted with respect to the longitudinal axis of the aircraft. A deployment mechanism can be provided to effect deployment of the spoilers. During operation, the spoilers can be selectively deployed in order to impart an unbalanced drag force on one wing, thereby imparting the desired yaw moment to an aircraft in flight.

The creation of yaw moments, without any down force, has application in sweptback wings where the tips are behind the center of gravity of the aircraft. This invention provides the advantage of reducing radar cross section over traditional (forward hinged, rearward opening) spoilers where there must be a spoiler on the bottom side to counter the down force created by the top spoiler. However, this invention can be used on any wing planform.

Using this invention on a swept wing takes advantage of the canted hinge-line. The discovered phenomenon is that a forward opening spoiler produces drag without a change in the pitch moment as long as the hinge-line is canted away from being perpendicular with the airflow. The cant angle can be such as to dump the air either away from the centerline or toward it. When the surface is raised, this cant angle produces a lateral force, which is also, either toward or away from the centerline. It is important to carefully choose whether this force is toward or away based on the sweep angle. In a swept back wing, the control surface is aft of the center of gravity, and if the hinge-line is canted so the side force is inward, a moment is produced that is in the same sense as the moment produced by the drag. With the same line of reasoning, if the wing is swept forward there is an advantage in canting the hinge-line of the surface to dump the air inwardly. If the wing is straight the hinge-line must still be canted away, but there is no advantage to dumping the air in either direction. Only the drag component is useful.

The invention also encompasses a method of providing yaw control of an aircraft, the method comprising the steps of providing a first forward opening, canted spoiler in a top surface of a first wing of the aircraft, providing a second forward opening, canted spoiler in a top surface of a second wing of the aircraft, and operating the first and second spoilers differentially to create a yaw moment.

While particular embodiments of this invention have been described above for purposes of illustration, it will be evident to those skilled in the art that numerous variations of the details of the present invention may be made without departing from the invention as defined in the appended claims.

What is claimed is:

1. An aircraft comprising:
   first and second wings positioned on opposite sides of a longitudinal axis, each of the first and second wings including an upper surface and a lower surface, wherein no control surfaces are attached to the lower surface of the first and second wings;
   a first forward opening control surface being attached by a first hinge to an upper surface of the first wing; and
   a second forward opening control surface being attached by a second hinge to an upper surface of the second wing;
   wherein each of the first and second hinges is canted with respect to a direction perpendicular to air flow during flight of the aircraft.

2. An aircraft, comprising:
   an integrated fuselage/wing structure generally defining the aircraft, the integrated fuselage/wing structure including an upper surface and a lower surface, wherein no control surfaces are attached to the lower surface;
   a first forward opening control surface integrally formed with the upper surface of the integrated fuselage/wing, and connected to the upper surface of the integrated fuselage/wing by a first hinge; and
   a second forward opening control surface integrally formed with the upper surface of the integrated fuselage/wing, and connected to the upper surface of the integrated fuselage/wing by a second hinge;
   wherein the first and second control surfaces are canted with respect to a direction perpendicular to air flow during flight of the aircraft.

* * * * *